Dec. 8, 1936.   H. W. ZIMMERMAN   2,063,217
CYLINDER GRINDING TOOL ADJUSTING MECHANISM
Filed June 11, 1928   2 Sheets-Sheet 2
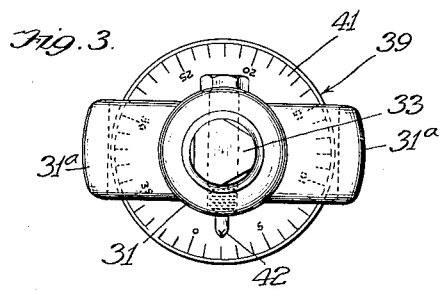
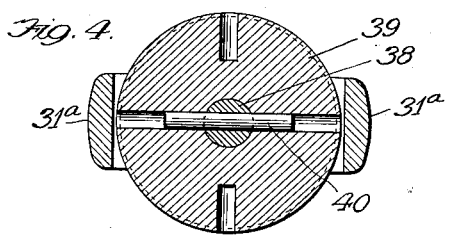
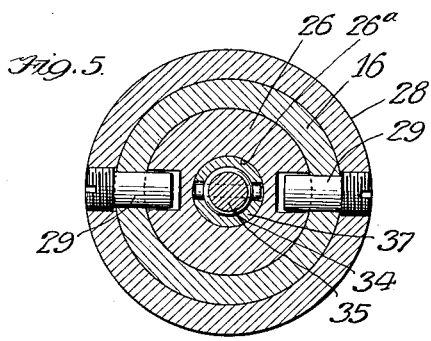
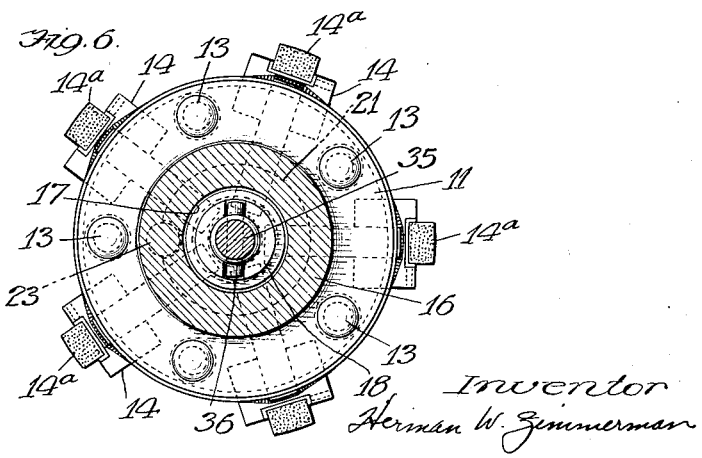

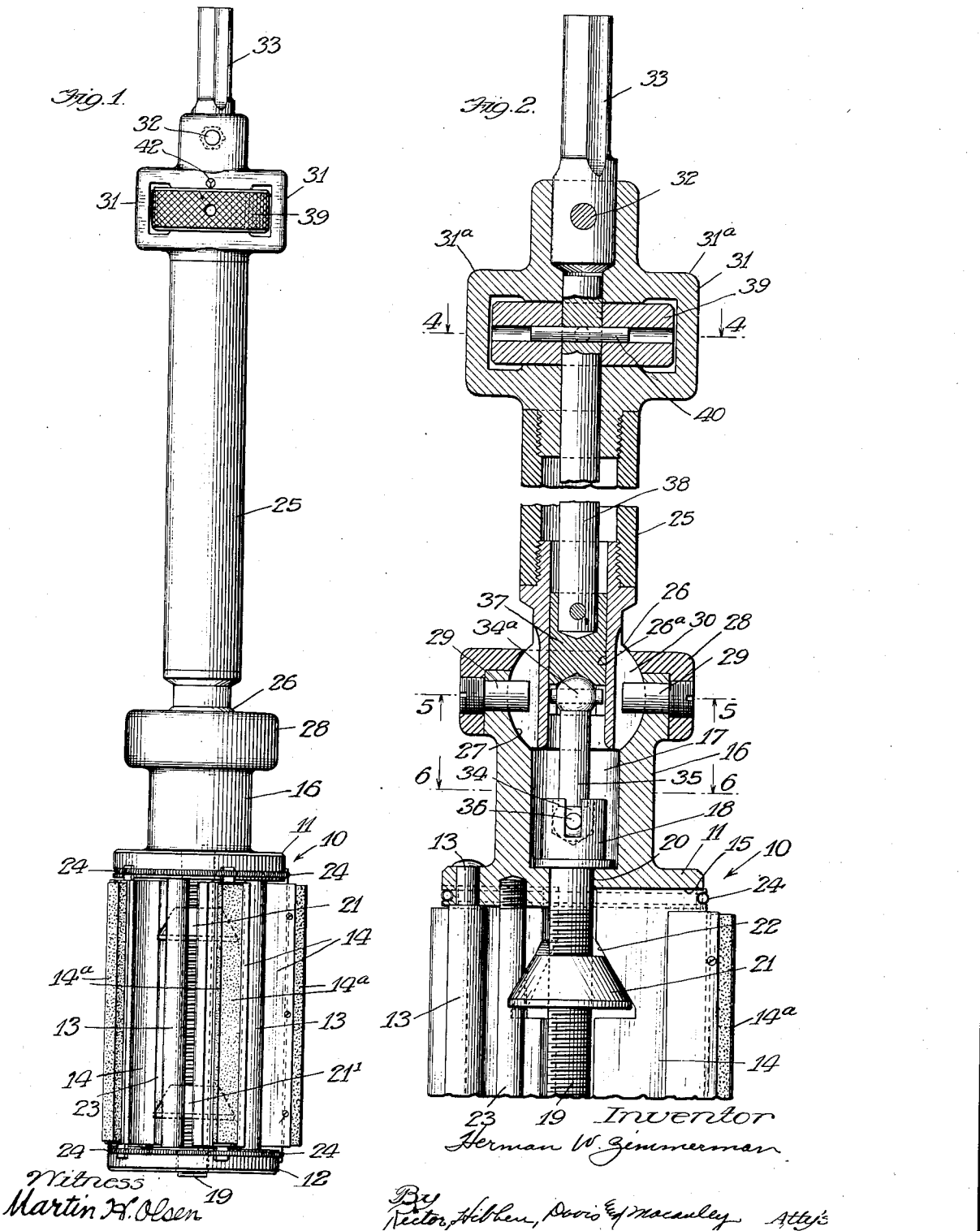

Patented Dec. 8, 1936

2,063,217

UNITED STATES PATENT OFFICE 2,063,217

CYLINDER GRINDING TOOL ADJUSTING MECHANISM

Herman W. Zimmerman, Chicago, Ill., assignor to Automotive Maintenance Machinery Co., Chicago, Ill., a corporation of Illinois Application June 11, 1928, Serial No. 284,356

2 Claims. (Cl. 51—184.3)

My invention relates generally to a tool adapted for the grinding of the bores of engine, pump, or other cylinders either in factory production-work or in the reconditioning of worn cylinders, and it has to do particularly with mechanism for adjusting the abrading stones of such tool.

One of the objects of my invention is to provide an improved adjusting mechanism which enables the operator to adjust the grinding stones of the tool easily and quickly with a minimum of effort and with a high degree of accuracy from time to time during the grinding operation without removing the tool from the cylinder bore and without breaking the connections between the tool and the drive means.

Other objects are to provide a tool which is of simple and rugged construction, economical to manufacture and highly efficient in functioning; to insure that any adjustment of the grinding stones which the operator may make will be maintained during the grinding operation and until the operator manually changes the same; to provide for free adjustment of the grinding stones while the tool remains in the cylinder regardless of disalignment of the tool and its driving connections; and to provide means whereby cylinder surfaces may be ground with true cylindricity to the desired accurate diameter and smooth finish.

Other objects and advantages will become apparent as this description progresses and by reference to the drawings wherein,—

Figure 1 is a view in elevation of one form of grinding tool and adjusting mechanism embodying my invention;

Fig. 2 is an enlarged vertical sectional view of the structure of Fig. 1 and showing only the upper portion of the grinding tool frame which carries the abrading stone;

Fig. 3 is a top plan view of the structure shown in Fig. 2;

Fig. 4 is a horizontal section taken substantially on line 4—4 of Fig. 2;

Fig. 5 is a horizontal section taken substantially on line 5—5 of Fig. 2; and

Fig. 6 is a horizontal section taken substantially on line 6—6 of Fig. 2.

My invention is well adapted to a grinding tool of a type wherein the grinding stones are radially adjustable toward and from the surface of the cylinder cavity, but it is to be understood that it may also have to do with any other form of cylinder grinding tool in connection with which similar adjustment problems exist.

I have chosen to illustrate my invention as applied to a tool of the radially-adjustable character which, with reference to the drawings, includes a body or frame 10 of "cage" construction having top and bottom plates 11 and 12, respectively, rigidly joined together by a plurality of connecting rods 13 which are so arranged that a center space and radial passages are provided. Stone carriers 14 are mounted in the radial passages in such a way that their ends ride in radial slots 15 in the end plates 11 and 12 for guidance and support in their radial movements. The top plate structure is extended radially upward providing a tool head 16 which is associated with suitable driving connections in a manner which will be explained hereinafter.

The radial movements of the stone carriers 14 are provided for as follows: The tool head 16 is provided with a radial bore 17 which receives the enlarged head 18 of an adjusting stem 19, the reduced threaded body of which passes freely through a center opening 20 in the top plate 11 and extends axially through the tool body and through the lower end plate 12. This center-stem 19 is thus mounted for free rotation without longitudinal displacement. Two spreader cones 21, 21' mounted upon the stem 19 engage complementally shaped notches 22 in the inner edges of the stone carriers 14. A guide bar 23 carried by the end plates 11 and 12 engages suitable notches in the cone-spreaders 21, 21' to prevent rotation of the latter with the result that when the center stem 19 is rotated, say in a clockwise direction, the cone spreaders 21 are moved upwardly to expand the stone carriers 14 outwardly in a radial direction in a manner which will be well understood.

While the stone carriers are free to move radially along their guide channels 15, they are normally spring retracted to hold them firmly against the wedge-cones 21, 21' by spring rings 24 at each end of the tool. Thus, when it is desired to contract the tool, as when inserting it in the cylinder or removing it therefrom, the center stem 19 is turned in the anti-clockwise direction thereby adjusting the spreader cones downwardly and permitting the spring rings 24 to move the stone carriers radially inward.

When it is desired to grind a cylinder bore, the tool is inserted within the bore and the stone carriers 14 are adjusted to bring the abrading stone 14ᵃ into the desired frictional engagement with the cylinder wall surface. The tool is then rotated and, as this rotation takes place, it may be necessary from time to time to make further adjustments of the stone carriers to bring the surface to the desired accurate diameter and finish. It is highly desirable from time-saving and cost standpoints that adjustment of the stone carriers be made without removing the tool from the cylinder and without breaking any of the driving connections.

It is further well known that wear takes place only along the surface within the limits of ring travel. Because of this, practice has demonstrated that, in the grinding of a worn cylinder, it is desirable that the grinding operation be started at the bottom of the cylinder surface where wear has not taken place. Such unworn surface provides at the beginning an accurate guide, and by starting the grinding at this point a cylindrical surface in true alignment with the crank shaft is insured. In carrying out this practice, it is, therefore, highly desirable that the tool adjustment means be so located that it is readily accessible regardless of the position of the tool within the cylinder so as to avoid disturbing the tool at any time during the grinding operation.

The primary purpose of my invention is to provide for the foregoing features. To that end, I preferably employ a hollow intermediate driven shaft 25 (Figs. 1 and 2) which detachably carries at its lower end a partispherical head 26. This shaft head 26 is snugly received in a cylindrical socket 27 formed as an extension of the axial bore 17 in the upper part of the tool head 16, and it is adjustably secured within this socket, for universal movements, by a suitably apertured cap 28 fitting over the upper part of the tool head 16 (Fig. 2). The cap 28 is securely held in place by diametrically opposed pins 29 threadedly engaging the side wall of the cap, such pins being long enough to pass through the adjacent wall surface of the tool head and engage diametrically opposed slots 30 in the shaft head 26 to permit of the desired rocking movements of this head relative to the tool while, at the same time, fixing these parts together for rotary driving movement. An enlarged cage-like head 31 is detachably mounted upon the upper or outer end of the intermediate drive shaft 25, and a driving element 33 is secured to this cage-head structure by means of a bolt 32. This driving element 33 may be connected to any desired source of power such as an electric drill, etc., to rotate the shaft 25 and tool. From the foregoing, it is obvious that by imparting rotary motion to the drive element 33, the intermediate shaft 25 and the tool are rotated together to accomplish the grinding of the cylinder surfaces, and disalignment between the tool proper and the driving means is compensated for by the above described universal connection.

To provide for rotation of the center stem 19 to adjust the stone carriers, the adjusting stem head 18 is provided with a socket adapted to receive a slightly enlarged spherical end 34 of a universal connecter member 35. This socket is provided with opposed slots extending through its walls which receive the projecting ends of a diametrical pin 36 passing through the connecter end 34 thereby providing for universal movement between such end and the screw stem, but, at the same time, providing for rotation of the connecter 35 and stem together. The other end of the universal connecter 35 is also provided with a similar spherical joint part 34ª which is seated within a socket in the lower end of a cylindrical coupling member 37 which is rotatively supported within the arial bore 26ª of the shaft head 26. This latter socket is also provided with opposed slots which receive the ends of a diametrical pin carried by the end part 34ª thereby providing a universal connection between the coupling member 37 and the universal connecter 35. The opposite, or outer, end of the coupling member 37 is fixedly connected to an adjusting rod 38 which passes axially through the shaft 25 and which has its outer end rotatably supported by the cage-like shaft head 31. This cage-like head preferably takes the form shown in Figs. 2 and 3 providing an open center space. An adjusting disk 39 is rotatably seated in the open center space of the cage-like shaft head, and it is provided with a central opening through which the adjusting rod 38 passes. The disk and adjusting rod are provided with diametrical openings which receive a pin 40 for fastening the same together. The adjusting rod 38 extends entirely through the disk and has its outer end rotatably supported by the upper part of the cage-head 31. The upper and lower parts of the cage-head are integrally connected by opposed, rectangularly-shaped loop arms 31ª which pass around the edge of the disk in spaced relation thereto enabling the operator to readily grasp the peripheral surface of the disk for adjustment of the latter without impairing the strength and rigidity of the driving connecters.

From the foregoing it is obvious that to adjust the center stem 19 to move the spreader cones 21, 21' to expand or contract the stone carriers, the disk 39 is rotated in the proper direction and this motion is transmitted to the stem 19 through the rod 38 and universal connecter 35. Any disalignment between the cylinder and the driving means is compensated for by the universal connection between the rod 38 and stem 19 whereby the above adjustments may be made freely and quickly at all times. It will be understood that while I preferably employ the foregoing universal connection as an alignment-compensation means, flexible connections may well be substituted therefor without departing from my invention. Obviously, the tool need not be removed from the cylinder, nor the driving connections need not be broken to make the desired adjustment. Such adjustment may be easily made regardless of the position of the stone carriers within the cylinder. The disk 39 is located adjacent the driving means so that adjustments may be made with a minimum of effort on the parts of the operator.

The mechanism above described, including the shaft 25, rod 38, etc., rotates as a unit during the grinding operation. Consequently, the tool is brought to rest before the disk 39 is adjusted to set the grinding stone to the desired position. This arrangement, obviously, provides a self-locking adjustment means. Once the adjustment is made, it remains fixed until the operator again manually changes the same.

To aid in the accuracy of adjustments and to facilitate accurate grinding of successive cylinders to substantially the same extent, the upper part of the element 39 is provided with a scale indicated at 41 in Fig. 3. Each graduation on this scale may represent an adjustment of one thousandth inch or any other desired unit of measurement. The cage-head 31 immediately above the scale 41 is provided with a pointer 42. In use, when the tool is inserted in the cylinder, the disk 39 is rotated to set the grinding stones at the proper position in engagement with the cylinder wall surface. When this is done, the pointer 42 will indicate on the scale the starting point of the grinding operation. If it is desired to remove say .005 inch from the cylinder wall surface, the disk 39 is adjusted from time to time as the grinding operation progresses until it has been moved forward five points (each point indicating one thousandth inch) from the starting point on the scale 41. Thus, .005 inch may be successively removed with a dependable degree of accuracy from the surface of a plurality of cylinders. This arrangement also facilitates the work of the operator by relieving him of the necessity of frequently gauging the extent of the grinding cut during the grinding operation as has been customary heretofore.

It will be understood that in referring to "grinding stones" or "abrading stones", the term is used in a broad sense as referring to any abrading or polishing element for grinding or finishing work. It will also be understood that while I have shown and described only one form of my invention, changes in the details and arrangements of parts may be made without departing from the spirit and scope of my invention as defined by the claims which follow.

I claim:

1. In a cylinder grinding tool, the combination of a frame, a plurality of abrasive members mounted in said frame for expansion and contraction movements, a tubular driven element, means affording universal movement connecting one end of said tubular element to said frame, means adapted for connecting the other end of said tubular element to a driving mechanism, and means for adjusting said abrasive members comprising frame-carried devices engaging said abrasive members and adjustable therealong, an exteriorly-accessible adjusting member carried by said tubular element intermediate said universal connecting means and said drive connecting means, said adjusting member being capable of actuation by one's hand without changing or detaching any of the tool parts, and connections passing through said tubular element and connected to said adjusting member and to said frame-carried devices, said connections including a shaft rigidly connected directly to said adjusting member and extending through the latter toward said frame, a bearing element fixed to the end of said shaft adjacent said frame and serving to support said shaft rotatably within said tubular element, and a connector member adjacent the universal connection between said tubular element and said frame and detachably connected to both said bearing elements and said frame-carried devices by joint means affording universal action.

2. In a cylinder grinding tool, the combination of a frame, a plurality of abrasive carriers mounted in said frame for expansion and contraction movements, a tubular driven element, means affording universal movement connecting one end of said tubular element to said frame, means adapted for connecting the other end of said tubular element to a driving mechanism, and means for adjusting said carriers comprising a stem member carried axially of and by said frame, expanding devices carried by said stem member and engaging said carriers to expand the latter as said devices are moved axially of said frame, and means for actuating said stem member to adjust said devices and carriers which includes an accessible member rotatably carried by said tubular element between the ends of the latter, a shaft attached to said accessible member and extending within said tubular element toward said frame, a bearing element on the end of said shaft adjacent said frame rotatably supporting said shaft within said tubular element, said bearing element having a socket formed therein, a socket element on the end of said stem member adjacent said tubular element, and a universal connector adjacent the connection between said tubular element and frame and having its opposite ends releasably engaged within said socket and socket element to accommodate the universal driving action between said tubular element and frame.

HERMAN W. ZIMMERMAN.